United States Patent

Kreis et al.

[11] Patent Number: 5,324,133
[45] Date of Patent: Jun. 28, 1994

[54] ALUMINUM BEARER FOR A BEARER JOINT IN A VEHICLE BODY WORK AND METHOD OF REPLACEMENT

[75] Inventors: Gundolf Kreis, Oberstimm; Karl Reiter, Lenting; Heinrich Timm, Ingolstadt, all of Fed. Rep. of Germany

[73] Assignee: Audi AG, Ingoldstadt, Fed. Rep. of Germany

[21] Appl. No.: 30,035

[22] PCT Filed: Nov. 26, 1991

[86] PCT No.: PCT/EP91/02232

§ 371 Date: Mar. 16, 1993

§ 102(e) Date: Mar. 16, 1993

[87] PCT Pub. No.: WO92/11163

PCT Pub. Date: Jul. 9, 1992

[30] Foreign Application Priority Data

Dec. 20, 1990 [DE] Fed. Rep. of Germany ....... 4040945

[51] Int. Cl.$^5$ .................. F16L 13/04; B23P 6/00; B62D 25/08; B60R 19/34

[52] U.S. Cl. .................. 403/270; 29/402.13; 29/402.16; 29/897.1; 29/897.2; 52/105; 52/653.2; 228/119; 228/154; 228/160; 296/29; 296/194; 296/205

[58] Field of Search ........... 29/402.09, 402.11, 402.13, 29/402.16, 897.1, 897.2; 228/119, 154, 160, 189; 296/29, 194, 189, 204, 205; 403/270, 286, 268, 271; 52/105, 653.2, 726.1

[56] References Cited

U.S. PATENT DOCUMENTS

| | | | |
|---|---|---|---|
| 2,366,698 | 1/1945 | Cole | 29/402.13 X |
| 2,880,013 | 3/1959 | Dean | 280/106 |
| 3,252,211 | 5/1966 | Lindstrom | 29/401 |
| 3,412,628 | 11/1968 | DeGain | 29/897.2 X |
| 4,051,954 | 10/1977 | Roberts | 29/402.13 X |
| 4,700,033 | 10/1987 | Clark, Jr. | 29/402.13 X |
| 4,735,355 | 4/1988 | Browning | 228/189 |
| 5,085,485 | 2/1992 | Wurl | 296/204 |

FOREIGN PATENT DOCUMENTS

| | | |
|---|---|---|
| 0146716 | 12/1988 | European Pat. Off. . |
| 3447036 | 7/1986 | Fed. Rep. of Germany . |
| 3740402 | 6/1989 | Fed. Rep. of Germany . |
| 2394422 | 1/1979 | France . |
| 0167097 | 4/1985 | Japan . |
| 4-38277 | 2/1992 | Japan .................. 296/29 |
| 743526 | 1/1956 | United Kingdom ........ 228/154 |
| 92/11164 | 7/1992 | World Int. Prop. O. ......... 296/29 |
| 92/11168 | 7/1992 | World Int. Prop. O. ......... 296/29 |
| 92/11169 | 7/1992 | World Int. Prop. O. ......... 296/29 |

*Primary Examiner*—Mark Rosenbaum
*Assistant Examiner*—S. Thomas Hughes
*Attorney, Agent, or Firm*—Jacques M. Dulin

[57] ABSTRACT

A bearer joint for a vehicle bodywork, and in particular a longitudinal front bearer joint, and a process for placing an aluminum bearer on the bearer joint in the vehicle bodywork. The bearer joint comprises a cast aluminum connector for joining together a first forward bearer and a second adjacent bearer. The connector includes a tubular aluminum recess for receiving the rearward end of the first aluminum bearer which is fixed thereto by a transverse weld seam at the front receiving edge of the recess. To replace a damaged front bearer, a ring cut is made to the outer wall of the aluminum recess at a distance from the forward receiving edge corresponding to the zone of thermal influence of the heat affected zone adjacent the weld. A damaged front bearer is then withdrawn from the recess and replaced by a new front bearer which is also welded to the new forward cut edge of the aluminum recess. In this way the front bearer is replaced without compromising the original strength of the bearer joint. The depth of the aluminum recess is sufficiently deep to permit a desired number of repetitions of the repair procedure and still provide for a sufficient depth to ensure a positive locking engagement of the front bearer within the recess.

6 Claims, 1 Drawing Sheet

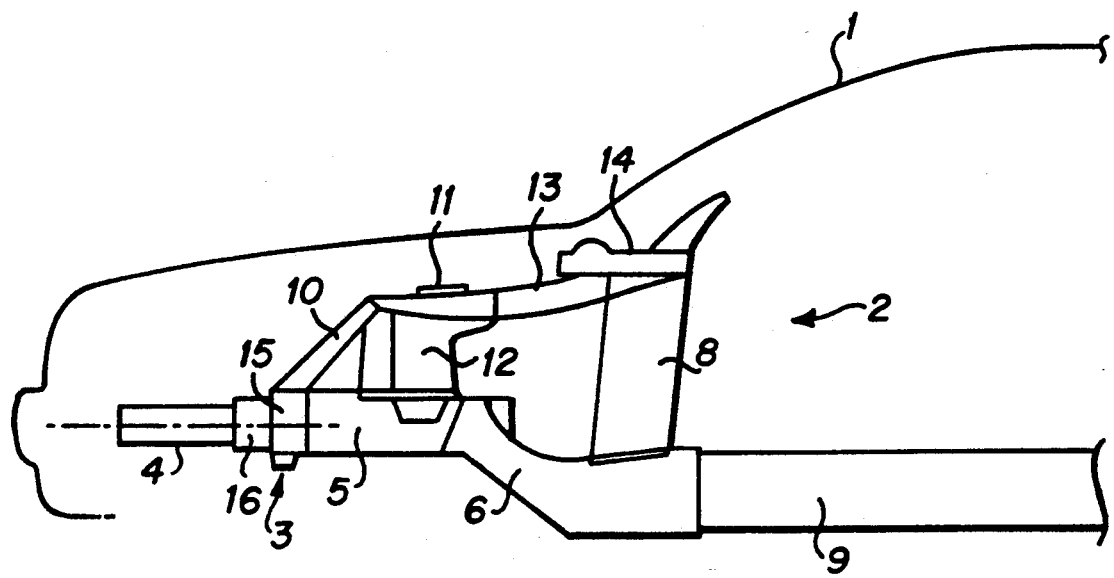
Fig_1
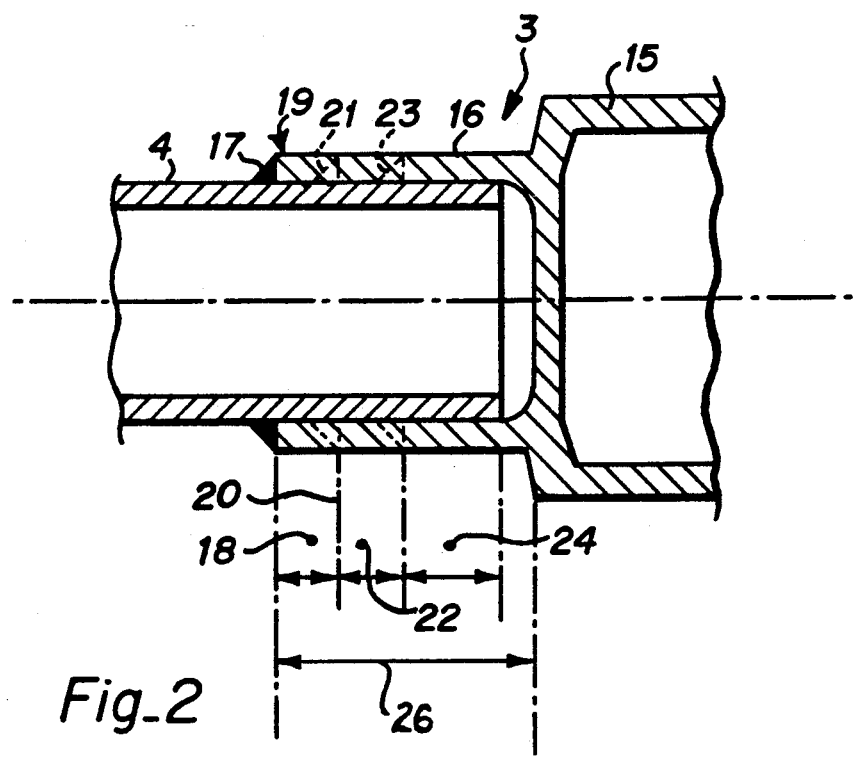
Fig_2

ALUMINUM BEARER FOR A BEARER JOINT IN A VEHICLE BODY WORK AND METHOD OF REPLACEMENT

BACKGROUND OF THE INVENTION

1. Field of the Invention

The present invention relates generally to repair techniques for a motor vehicle bodywork. More particularly, the invention relates to a method or apparatus for replacement of an aluminum bearer at a longitudinal bearer joint in a vehicle bodywork.

2. Description of the Prior Art

From published European Patent document EP-PS 0 146 716, it is known how to produce the load-bearing structure of a vehicle bodywork by using nodal connector elements for joining together hollow section bearers. Extruded aluminum sections are used as the hollow section bearers and cast aluminum joint pieces are used as the nodal connector elements.

In the familiar longitudinal bearer design of a vehicle frame disclosed in German Patent document DE-OS 37 40 402, the longitudinal bearers are partitioned before the assembly is suspended in place. Here again, the forward most portion of the longitudinal bearer is fashioned as a plurality of joined together deformation elements, so that they are more easily deformed than the adjacent rearward portions of the longitudinal bearer. The longitudinal bearer comprises a plurality of bearer segments, arranged in succession, and which are connected together at abutting ends or bearing surfaces. The abutting bearing surfaces are designed as rotational surfaces in the transverse direction. A central, axially aligned connection is used to join the abutting bearing surfaces together.

This configuration is especially advantageous when the bearer segments are formed as extruded aluminum sections, since the easily accessible bolt connection permits quick and simple replacement of a forward deformed longitudinal bearer piece after a minor collision. Also, the strength loss problems associated with the replacement of aluminum welds does not occur. However, the costs of such bolt connections are relatively high.

It is also known from the prior art how to construct a hollow-section longitudinal bearer assembly of a vehicle frame from a plurality of deformable longitudinal bearer segments. These individual longitudinal bearer segments are joined together, in end to end fashion, by a surrounding weld beginning with the forward most segment and working rearwards. Each succeeding longitudinal bearer segment is dimensioned with a progressively greater wall thickness and/or are made of a progressively higher grade of material than its preceding bearer segment so that the resulting longitudinal bearer assembly has a resistance to deformation which increases toward the middle of the vehicle. This provides for a graduated resistance to deformation up to the middle of the vehicle so that in the event of a minor accident, only one or two of the forward most longitudinal bearer segments will deform without damage to the adjacent successive (rearward) bearer segments depending on the severity of the accident. This arrangement greatly facilitates the repair of the vehicle front end since only the deformed segments need replacement and this arrangement also avoids an undesirable total deformation of the vehicle frame in less severe accidents.

In the vehicle frame of the type described, replacement of the deformed longitudinal bearer segments involved is accomplished by cutting out the damaged segments and welding on new bearer segments. For the case where the longitudinal bearer comprises of sheet-metal segments, this repair procedure does not give rise to any major structural problems since the original strength of the sheet metal is substantially retained even after welding.

It is also well known in the art to provide a connection for a longitudinal bearer in a vehicle body wherein an aluminum bearer is formed as an extruded section and is inserted into a tubular aluminum recess of a cast metal piece. The aluminum bearer is then welded to the front edge of this tubular recess by a surrounding weld seam. Such a connection is stable and economical.

However, it is commonly known that the thermal welding of heat treatable aluminum alloys produces a significant decrease in the strength in the material in the so-called "zone of thermal influence" immediately adjacent the weld zone. A surrounding weld connection, as is used in the above-described bearer joint, is especially critical, since it produces a weakening in a continuous transverse plane. The decrease in strength of a first bearer joint and a first welding procedure can be factored into the dimensions. However, in view of the related welding procedure required in the typical replacement of bearers whereby the weld seam is first cut out and a new bearer piece is then inserted and welded to the front edge of the tubular recess, there is a resulting uncontrollable damage to the grain texture and a correspondingly large decrease in strength in the material and danger of fracture during heavy load conditions.

This is particularly problematic in the situation where the member is connected to a divided longitudinal bearer, since in this situation it is taken for granted that the more easily deformed forward sections of the longitudinal bearer assembly will necessarily be replaced during repairs after an accident, and perhaps may even need to be replaced at least once for normal wear or fatigue during the lifetime of the vehicle. The welding procedures repeatedly required in this case would unacceptably weaken the joint by progressive structural change in the zone of thermal influence of the material of the aluminum alloy.

While it is conceivable to incorporate an acceptable safety factor in the initial design such that the joint is sufficiently thick in the first instance so that even the aforesaid severe decrease in strength caused by successive welding procedures does not result in danger of fracture, this is not a practical solution for reasons of cost and weight. Furthermore, it is desirable to provide the customer with a vehicle body which retains its the original strength even after repairs.

SUMMARY OF THE INVENTION

It is a principle object of the present invention to provide an improved aluminum longitudinal bearer in a vehicle frame comprising a plurality of bearer segments, each of which are welded together at adjoining ends, and a repair technique for replacing deformed bearer segments wherein the original strength of the bearer joint is maintained even after repair.

It is another object of the present invention to provide an aluminum bearer and repair technique of the type herein described which is of low cost and which is easy to implement in the conventional vehicle body designs constructed from extruded aluminum frame components.

The invention comprises a method and apparatus for the replacement of a damaged aluminum bearer in a bearer joint of a motor vehicle bodywork comprises of aluminum frame members and cast aluminum connecting elements. According to a preferred embodiment of the invention, the front bearer joint comprises a cast aluminum connector for joining a first forward most extruded aluminum bearer member to a second adjacent aluminum bearer member which, in turn, is connected to successive bearer members of the front portion of the motor vehicle body framework in accordance with the known way. The connector includes a first tubular recess for receiving the rearward most end of the first forward or front bearer member. After insertion within the recess, the bearer member is fixed thereto by a peripheral transverse weld disposed at the forward edge of the recess. The insertion depth of the recess of the aluminum connector is sufficiently long to allow for two and, preferably, three zones of thermal influence (i.e., the area of the recessed wall immediately adjacent the transverse weld connection which is thermally weakened by welding) so that in the event of a collision causing damage to the front bearer member, it can be removed from the recess by performing a ring cut to the recessed wall at a distance corresponding to the first zone of thermal influence. In this manner, the damaged front bearer member may be removed from the recess of the connector and replaced by a new front bearer member which is then welded to the recess at its new forward cut edge.

When appropriately dimensioned the bearer replacement procedure described above may be performed several times without compromise to the original strength of the bearer joint. The repair in this manner also eliminates the need for replacing the cast aluminum connector element(s). This is desirable since these connectors often serve as a node point for joining together several frame members.

According to another aspect of the invention, transverse marks are provided to the outer surface of the recess at a distance corresponding to the first, second, third,..., etc., zones of thermal influence. In this way, the actual lengths of theses zones of thermal influence are made visible to the repair worker thereby eliminating guesswork when determining the appropriate location for performing the ring cut on the recess wall.

Other and further objects will become evident from the following written description, drawings and claims appended hereto.

BRIEF DESCRIPTION OF THE DRAWINGS

FIG. 1 is a partial schematic view in side elevation of the front region of a vehicle showing the front bearer structure of a vehicle body with a two-part front longitudinal bearer.

FIG. 2 is an enlarged fragmentary cross sectional view of the longitudinal bearer joint 3 of FIG. 1 showing the connection of a first front longitudinal bearer segment to a second front longitudinal section.

DETAILED DESCRIPTION OF THE BEST MODE

The following detailed description illustrate the invention by ways of example, not by way of limitation of the principles of the invention. This description will clearly enable one skilled in the art to make and use the invention, and describes several embodiments, adaptations, variations, alternatives and use of the invention, including what we presently believe is the best mode of carrying out the invention.

FIG. 1 is a schematic cross section view of a vehicle 1 which shows in side elevation view the front region of the bearer structure of the vehicle body generally designated at reference numeral 2. The bearer structure 2 includes a front longitudinal bearer 3 which consists of a plurality of abutting end-to-end connected light metal structural members, preferably of aluminum alloy, including a first or forwardmost front longitudinal bearer member 4, an adjacent second longitudinal bearer member 5, a side deviation 6 extending from the rear end of bearer member 5 to the base of the front door pillar or post 8 and a bottom sill 9 which connects to the rearward end of the side deviation 6.

The first longitudinal bearer member 4 and the second longitudinal bearer member 5 are joined together by a cast metal piece 15 which includes a bottom recess portion 16 for the fitted insertion of the first longitudinal bearer member 4. The cast piece 15 also is preferably formed with an attachment fitting along its upper surface for connection to the shock absorber strut 10.

A bearer 10 for supporting a shock absorber 11 extends upward from the front end of the second longitudinal bearer member 5, and is braced by another, substantially upright bearer 12 which extends upwardly from the right or rear portion of the second longitudinal bearer member 5. A bearer 13 connects the upright bearer 12 to the middle region 14 of the door post 8 to complete the front region of the bearer assembly 2 as shown.

FIG. 2 is an enlarged section view through the cast piece 15 shown having the first bearer member 4 inserted therein. In the preferred embodiment, the bearer member 4 is cylindrical in cross section, and is sized for snug fit engagement within the corresponding cylindrical recess 16 of the cast piece 15. The cylindrical recess 16 has an overall length 26. After the first bearer member 4 is secured to the cast piece 15 by welding a surrounding transverse weld seam 17 at the front edge of the cylindrical recess 16.

In the preferred embodiment, all of the bearer members are extruded or cast aluminum alloy sections. As will be appreciated by those of skill in the art, the welding procedure for the weld seam 17 creates a first zone of thermal influence 18, wherein a substantial loss of strength occurs as a result of structural change in the material. The axial length of this zone of thermal influence in the material of the recess 16 is indicated as zone 18. The first front longitudinal bearer member 4 is fashioned as a deformation element so that only this piece will deform in the event of a minor impact such that the parts coming thereafter, especially the cast piece 15 and the second longitudinal bearer member 5 will not be damaged. In such an impact, only the front longitudinal bearer member 4 needs to be replaced.

In accordance with the method aspects of the invention, the first step of the repair involves cutting off an outer ring portion 19 of the recess 16 at line 20 which corresponds to a safe distance beyond the weakened first zone of thermal influence 18. The ring portion 19 including the aluminum bearer 4 connected thereto by the weld seam 17 is then removed from the recess 16. Next, a new longitudinal bearer member 4 is inserted within the recess 16 (the depth of which is now shortened by a distance corresponding to the first zone of thermal influence 18) and welded to the recess by a new weld seam at 21, thus forming a second zone of thermal influence 22.

If another impact occurs which again results in the deformation of the first longitudinal bearer member 4, the above-described procedural steps may be repeated to perform another repair. That is, the second zone of thermal influence 22 is cut away and a new longitudinal bearer piece 4 is again attached by a weld seam at 23. The depth dimension of the remaining insertion zone 24 is selected to be sufficiently long to provide a strong and positive-locking connection. Notches or similar marking may be provided at the proposed seams 21 and 23 to assist the worker in making the repair.

This provides a repair procedure for bearers which are originally fastened by welded connections can be replaced and again fastened with another welded connection a number of times, without sacrificing strength.

It should be understood that various modifications within the scope of this invention can be made by one of ordinary skill in the art without departing from the spirit thereof. For example, while the invention has been described in detail with particular reference to the repair of damaged front longitudinal bearer members only, it is understood that the teaching principles of the invention may also be applied to aluminum bearer members located in other portions of the vehicle bodywork and which are subject to buckling along a common longitudinal axis. We therefore wish our invention to be defined by the scope of the appended claims as broadly as the prior art will permit, and in view of the specification if need be.

We claim:

1. A longitudinal front bearer joint assembly in a motor vehicle bodywork comprising in operative combination:
   a) a first aluminum bearer member;
   b) a second aluminum bearer member disposed behind said first aluminum bearer;
   c) a cast aluminum connector for joining said first aluminum bearer member to said second aluminum bearer member, said connector having:
      i) a first connector end mounted to a front end portion of said second aluminum bearer member;
      ii) a connector portion having a tubular recess for receivingly engaging a rear end portion of said first aluminum bearer member and terminating in a forward perimeter edge;
   d) said connector is secured to said first bearer member by a weld seam disposed at said forward perimeter edge of said connector portion;
   e) said connector portion having an axial depth dimension which includes:
      i) a locking length segment defining a minimum depth sufficient to ensure a positive locking engagement of said connector with said first aluminum bearer member;
      ii) at least one thermal length segment corresponding to a zone of thermal influence wherein a significant decrease in strength of the bearer joint occurs as a result of said weld seam; and
   f) at least one transverse marking disposed along an outer surface of said connector portion at a point corresponding to a boundary location for said at least one thermal length segment.

2. A longitudinal bearer joint as in claim 1, wherein said axial depth dimension of said connector portion includes at least one additional thermal length segment arranged adjacent said at least one thermal length segment.

3. A longitudinal bearer joint as in claim 2, which includes at least one additional transverse marking disposed along an outer surface of said connector portion at a point corresponding to a boundary location for said at least one additional thermal length segment.

4. A method of replacement of said first aluminum bearer member in the longitudinal bearer joint of a motor vehicle bodywork of claim 1 comprising the steps of:
   a) making a cut to remove a forward ring portion of said connector portion, said cut being located behind said perimeter edge weld seam at a distance corresponding to said at least one thermal length segment and forming a newly cut perimeter edge of said connector portion;
   b) removing said first aluminum bearer member including the cut ring portion welded thereto;
   c) inserting a replacement first aluminum bearer member within the remaining connector portion; and
   d) welding said replacement first aluminum bearer member to said newly cut perimeter edge of said connector portion.

5. A method for replacement of an aluminum bearer as in claim 4, wherein said axial depth dimension of said connector portion includes at least one additional thermal length segment arranged adjacent said at least one thermal length segment.

6. A method for replacement of an aluminum bearer member as in claim 5, which further includes marking the outer surface of said connector portion with at least one cut point corresponding to a boundary location of said at least one additional thermal length segment.

* * * * *